Sept. 12, 1939.  R. BLONDELLE  2,172,694
ANEROID ALTIMETRIC DEVICE WITH A HIGH AMPLITUDE FOR AIRCRAFT
Filed Oct. 26, 1936
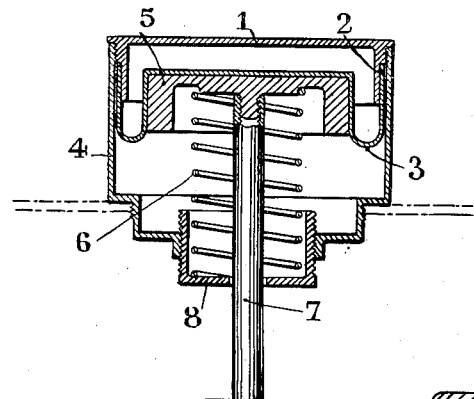
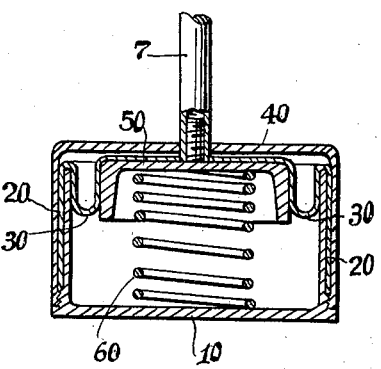
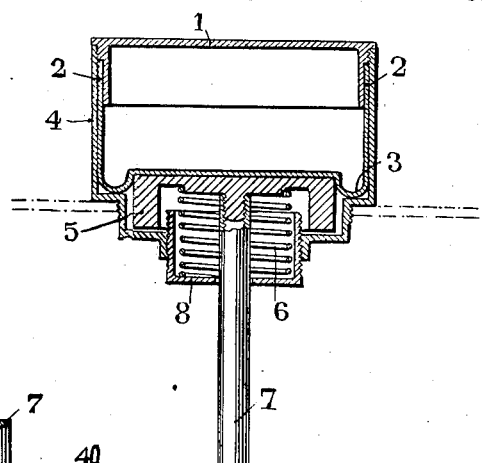
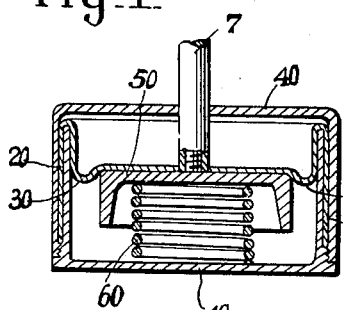

Patented Sept. 12, 1939

2,172,694

UNITED STATES PATENT OFFICE 2,172,694

ANEROID ALTIMETRIC DEVICE WITH A HIGH AMPLITUDE FOR AIRCRAFT

Roger Blondelle, Paris, France

Application October 26, 1936, Serial No. 107,743
In France October 29, 1935

1 Claim. (Cl. 137—156)

My invention relates to an aneroid altimetric device adapted to be used in controlling apparatus carried by an aircraft.

It has already been proposed with a view to securing the operation of apparatus located on board of an aircraft, as well as of the motor to provide said parts with a correcting device which opposes the effect of the atmospheric depression at high altitudes.

Some devices of that kind, however, are not of a character as to allow the obtainance of satisfactory results by reason of their limited displacement and of their reduced sensitiveness whilst, on another hand, the space occupied by said devices often causes a very important disadvantage.

The device according to my invention which remedies the above drawbacks comprises in combination a closed tight receptacle having for instance a rigid bottom tightly connected with a flexible distortable non-extensible wall in connection with a piston or like member provided with a return spring with a view to providing a device which may control directly the correction necessary for rendering aircraft able to be used at variable altitudes without the help of additional members or parts.

My invention also relates to a device in which the tight distortable receptacle constitutes a volume in which exists a pressure conveniently lower than the atmospheric pressure, and the value of which is preferably zero. The device is not affected by the changes of temperature. The controlling member of the device is preferably constituted by a spring. Thus external influences are prevented from affecting the device allowing higher precision to be obtained in the operations while on another hand, the apparatus is weatherproof.

In the accompanying drawing there is shown by way of example two preferred embodiments of my device which are designed for being applied to aircraft and used as regulating apparatus for such purposes as controlling air feed to the pilot of aircraft:

Figs. 1 and 2 show in two different positions of operation an axial vertical section of said device, Figs. 3 and 4 show similar views of another constructional form.

The device comprises a box or receptacle with a rigid end wall 1 made of metal or any suitable substance and which accommodates on its edge 2 a distortable but non-extensible and tight wall 3. The flexible wall 3 is preferably contained inside the side wall 4.

The distortable wall 3 is secured to a piston 5 provided with a spring 6 and with a stem 7 which passes freely through a cup 8 which constitutes an adjustable abutment for the spring 6. The space which is left free between closed end wall 1 and distortable wall 3 contains a conveniently elastic fluid which is introduced in said space under a suitable determined pressure. The pressure is kept under a variable value in all the conditions of operation of the device by reason of the tightness which the device offers by reason of the arrangement of the wall 1 and distortable wall 3.

The piston 5 is suitably shaped for constituting a support for the distortable wall 3. Such a result may be obtained by providing the piston 5 with a lateral external surface having substantially the same extent as the internal surface of the cylindrical wall 4.

Such a device as described above and shown in the drawing may be used for instance in regulating the feeding of breathable fluid to the pilot according to the altitude.

For that purpose, the stem 7 may be connected with any suitable regulating member (not shown in the drawing) and which may be constituted for instance by a needle valve, cock or the like, controlling the pipe which brings a breathable fluid to the pilot. The position of piston 5 is determined by the balance at any time realized for every temperature between the pressure on one of its faces inside the receptacle formed between the walls 1 and 3 and the pressure on its other face exerted by the spring 6, plus the density of the external air at the considered altitude. Such position of piston 5 and of its stem 7 causes a more or less important flowing of breathable fluid to be brought for the pilot according to the altitude.

Near the ground the parts occupy for instance the position of Fig. 1. When the altitude increases, the fluid contained inside the wall 3 actuates piston 5 to the position shown in Fig. 2.

The receptacle or box may be of any desired shape, the transverse cross section may be either circular, oval, polygonal or otherwise formed. The distortable wall 3 may be made of any suitable material.

The device may be applied directly upon the regulating member to be controlled or it may be connected with said members by means of suitable relays such as electric, mechanical or the like.

It will of course be possible to locate two or any number of devices in series according to the result to be obtained.

In the constructional form shown in Figs. 3 and 4, the device comprises as in Figs. 1 and 2, a rigid end wall 10 receiving on its edge 20 a distortable wall 30 the whole device being contained inside the box.

In this example, however, spring 60 which acts upon piston 50, is located inside the box. The stem 7 fixed to the piston passes freely through the wall 40 of the protecting box.

In the space existing between end wall 10 distortable wall 30 and piston 50 there is a depression which is conveniently determined relatively to the atmospheric pressure, said depression being in a position to offer any value or even the complete vacuum.

In this arrangement the movements of piston 50 and of its stem 7 takes place under the opposite actions of the atmospheric pressure and of the resilience of spring 60.

It may of course in some events be possible to substitute the compression spring 60 located inside the box for a tractive spring located externally to said box, especially if it is desired to modify the tension of said spring.

Said device may be applied to aircraft as for instance for oxygen apparatus used for pilots or for the regulation of feeding of motors by acting upon the arrival of the liquid fuel to the carburettor. The device may be of course be used as an altimeter in convenient determined condition.

What I claim is:

In an aneroid altimeter for controlling apparatus carried by an aircraft, a receptacle having a substantially cylindrical shaped wall, a rigid end wall closing one end of the receptacle, a piston movable in the receptacle, a flexible non-extensible member secured to the piston head and connected to the wall of the receptacle adjacent said end wall to provide a closed space between the flexible member and the end wall, a stem fixed to the piston extending axially therefrom, a threaded cup member closing the other end of the receptacle and having an opening therein through which said stem extends, and a spring surrounding said stem engaging said piston and said cup member.

ROGER BLONDELLE.